INVENTOR
ALBERT KNAFF
By: Hauetine, Lake & Co.
AGENTS

INVENTOR
ALBERT KNAFF
By:
Hazeltine, Lake & Co.
AGENTS

United States Patent Office 2,751,714
Patented June 26, 1956

2,751,714

PROCESS AND APPARATUS FOR THE CONTINUOUS PRODUCTION OF FLASHED GLASS

Albert Knaff, Uccle-Brussels, Belgium, assignor to Glaceries de St. Roch Societe Anonyme, Luxembourg, Brussels, Belgium, a Belgian company Application January 21, 1952, Serial No. 267,348

Claims priority, application Belgium February 1, 1951

10 Claims. (Cl. 49—3)

The present invention relates to a process and to apparatus for the continuous production of flashed glass, which are applicable to plants for the production of sheet glass both by rolling and by drawing.

In the processes hitherto employed, difficulties have been encountered in continuously producing flashed glass in which the thickness of the flashing layer can be varied at will, while remaining uniform over the entire area of the sheet.

In some processes, the two glasses to be flashed are separately rolled and are then welded by a subsequent rolling. However, it is impossible to roll regularly sheets of a thickness of less than 2 mm.

In other processes, crushed glass is spread by means of a distributor over the molten base glass. Since the bath of this glass must necessarily be near to the operating temperature, the melting of the crushed glass is imperfect and the surfaces obtained are rough.

It is also known to apply molten glass to molten base glass and to weld the two glasses in the débiteuse of a drawing plant. It is possible with this process to produce a thin flashing layer at the time when the sheet is formed, but the regularity of the formation of the sheet is thereby impaired. The thickness of the flashing depends essentially upon the temperatures of the two glasses, which are difficult to control with accuracy. This process is very delicate, and the regularity of the flashing width cannot be varied during operation, while the useful output of the process is low.

The invention has for its object to obviate these various disadvantages and to provide with complete regularity, glasses on which the flashing layer can be reduced to a fraction of a millimetre, while the thickness can be adjusted during the operation of the installation, whether it be a rolling installation or a drawing installation.

In accordance with the invention, the molten base glass is passed under a float constituting a receptacle into which the flashing glass is introduced, also in the molten state, the said flashing glass being made to overflow so that it forms on the surface of a base glass a thin layer which becomes welded thereto before the formation of the sheet. The thickness of the flashing layer may be adjusted at any time by varying the quantity of flashing glass introduced into the float and the constancy of the thickness of the flashing layer over the entire width of the sheet can be readily maintained even when this thickness is reduced to a fraction of a millimetre.

The apparatus employed for carrying out the process comprise a trough-like float immersed in the bath of base glass and fed by a small auxiliary tank containing the flashing bath. For the manufacture of flashed glasses of different colours, a number of auxiliary tanks may advantageously be provided which, in the inoperative position, are heated by the gases for the heating of the main tank containing the base glass, the auxiliary tank in operation being brought opposite the receptacle which it is to feed.

In the accompanying drawings, which show two examples of embodiment of the invention:

Figure 4:
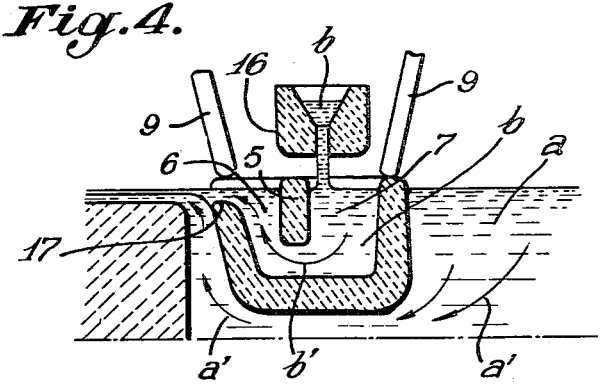
Figure 4 is a cross section, on a larger scale, through the float for the distribution of the flashing glass.

In the embodiment shown in Figures 1 to 4, the base glass $a$ is melted in a tank 1 which may be of usual construction and of which only the rear part is shown in the drawing. The refined molten glass runs through a sill 2 into a small fore-tank 3 in which there is almost completely immersed a float 4 in the form of a trough, provided with an internal barrier 5 which divides it into two compartments 6, 7 (Figure 4).

The float 4 extends over the entire width of the fore-tank 3, which is substantially equal to the width of the flashed glass sheet to be formed. In order to maintain the float in position, two recesses 8, intended to receive the ends thereof, are formed in the walls of the fore-tank. As the float is made of a ceramic material of lower density than the glass, the float is maintained at the required height in relation to the level of the molten glass by four adjustable push rods 9 which bear against the ends thereof. The said push rods can be adjusted from the outside by known means, such as those employed, for example, in the Fourcault process for adjusting the position of the débiteuse.

The float 4 forming a barrier in the path of the base glass arriving from the tank 1, this glass passes below the float in the direction of the arrows $a'$ (Figure 4) and flows through the sill 11 of the fore-tank towards the rolling arrangement 12.

The flashing glass $b$, for example an opaque or a coloured glass, is contained in a small auxiliary tank 10 which bears against one of the walls of the fore-tank 3. A predetermined quantity of batch is continuously introduced by a feeding arrangement 14 of adjustable output into the said auxiliary tank, which is heated by a burner 13. The flashing glass melted and refined in the tank 10 passes under a barrier 15 and flows through a spout 16 into the rear compartment 7 of the float 4, in which it spreads out. After having passed under the barrier 5 (Figure 4), it rises in the direction of the arrows $b'$ into the compartment 6 and passes over the lip 17, which spreads it into a sheet of uniform thickness over the base glass, to which it is welded.

The thickness of the flashing layer depends upon the flow of flashing glass into the float 4, which in turn depends directly upon the quantities of batch introduced into said float by the device 14. Therefore, the thickness of the flashing layer is adjusted at will by regulating the feed rate of the device 14. In addition, the push rods 9 can be adjusted one relative to the other, to angularly incline the float 4 to maintain a regular distribution of the flashing over the entire width of the sheet. The sheet is then taken up in known manner by the rolling arrangement 12.

The two glasses are thus welded immediately they come into contact with one another, in the immediate proximity of the lip 17 of the float, that is to say, before the formation of the sheet in the rolling arrangement. It is thus possible to obtain perfectly welded flashed glasses, the flashing layer of which may be of any desired thickness relatively to the base glass.

By way of example, it has been found possible, with auxiliary tanks of very limited dimensions, to produce sheets with a flashing layer of a thickness of the order of only a tenth of a millimetre. Thus, in order to flash 3000 sq. m. per day with a layer of 0.1 mm. of opaque glass, the hourly melting capacity of the auxiliary tank was only about 32 kgs.

It is sometimes necessary to change rapidly from the production of a flashed glass to another glass of different colour. For this purpose, it is advantageous to provide a number of small auxiliary tanks 10, 10', 10'' ... (Figure 1) mounted on wheels 18 (Figure 4) so that they may be run on rails 19 and brought by a travelling platform 20 into the working position or into the waiting position in which they can be heated by burnt gases from the large tank.

Figure 1:
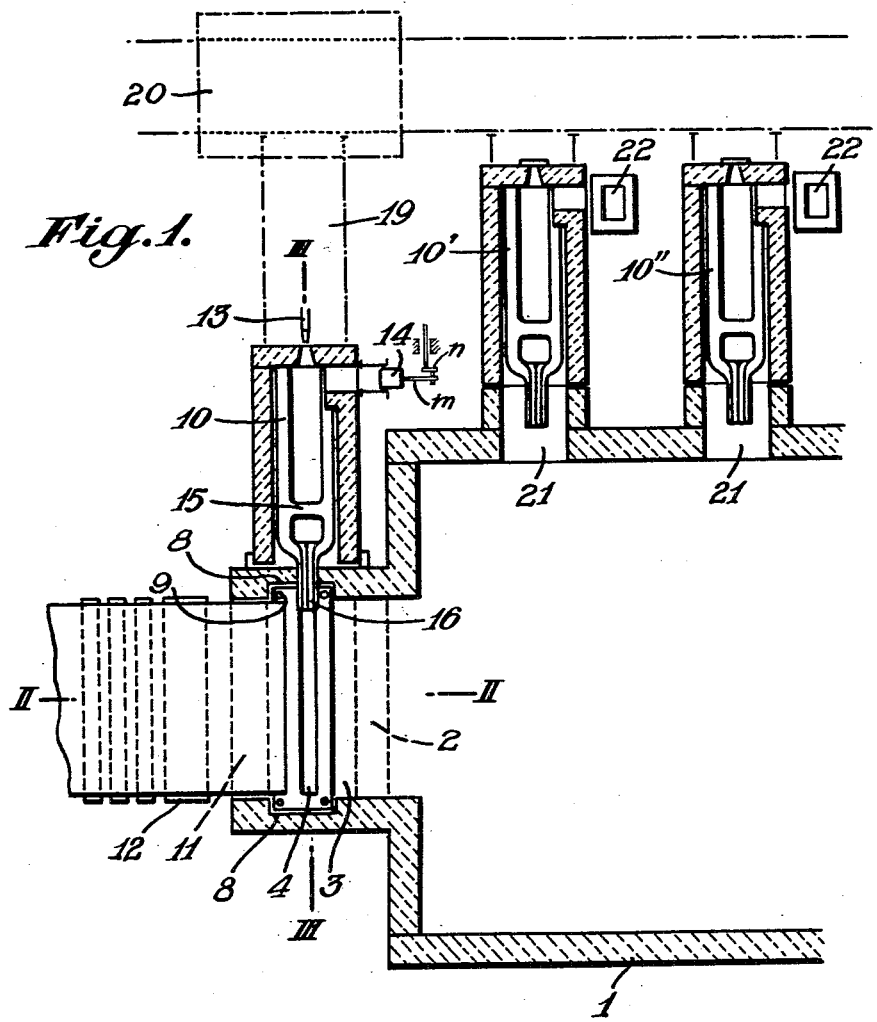
Figure 1 shows a furnace for the production of sheets of flashed glass by rolling, in a horizontal section along a line I—I (Fig. 2) extending above the level of the base glass.
Figure 2:
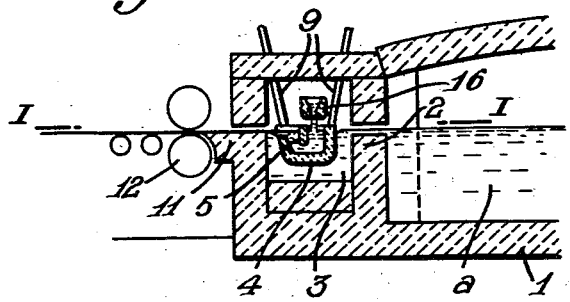
Figure 2 is a partial vertical section on the line II—II of Figure 1.
Figure 3:
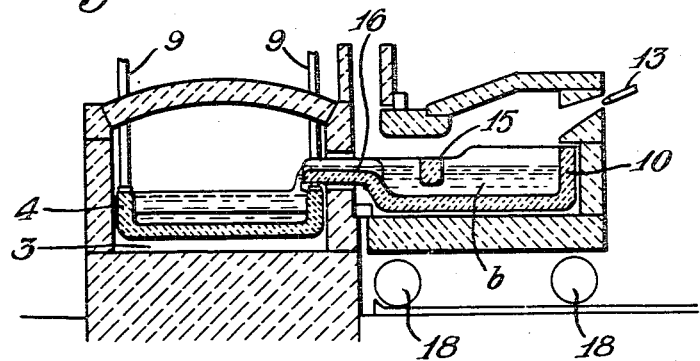
Figure 3 is a vertical section on the line III—III of Figure 1.

In Figure 1, the large tank 1 is assumed to be provided with burners at the top and a horseshoe-shaped flame, but naturally any other construction can be employed. Formed in one of the side walls are openings 21 opposite which are disposed small tanks 10', 10'' in the waiting position, the charging aperture of which communicates through a flue 22 with the main shaft.

It is thus possible to have available reserve tanks, each of which contains a glass of different colour and which are heated by a small branch stream of the burnt gases from the large tank.

Figure 5:
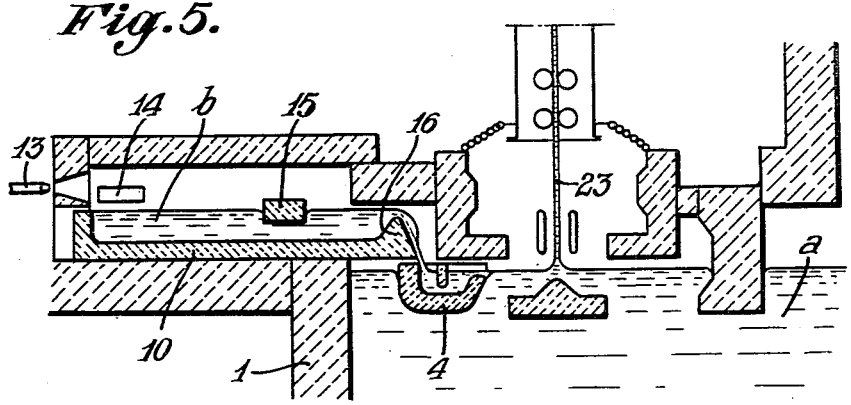
Figure 5 shows in vertical section an installation for the production of flashed glass by drawing.

The process according to the invention is also applicable to the production of flashed sheets by drawing. Figure 5 shows diagrammatically an arrangement suitable for this purpose, the reference characters employed in Figures 1 to 4 here being employed for elements corresponding to those which they designate in the said figures. The auxiliary furnace 10 is arranged at the side of the drawing shaft and the flashing glass $b$ is fed through the spout 16 into the float 4, the positioning of which in relation to the lower end of the drawn sheet 23 is such that return flow of the base glass $b$ cannot occur.

Of course modifications may be made to the devices shown by way of example without departing from the scope of the invention as set forth in the appended claims.

I claim:

1. A furnace for the continuous production of flashed glass comprising a melting tank for the base glass having a sill at a downstream outlet end over which molten base glass flows in a thin layer, a trough-shaped float extending across the outlet end of said tank, said float being partly immersed in the base glass and having an overflow lip situated below the level of said base glass, means for feeding flashing glass into said float, thereby causing said flashing glass to flow over said lip and spread out as a surface layer on the layer of base glass as it flows over said sill and means controlling the flow of flashing glass into said float and level of said float in said tank to control the thickness of the layer of flashing glass.

2. A furnace for the continuous production of flashed glass comprising a melting tank for the base glass having a sill at a downstream outlet end over which molten base glass flows in a thin layer, a trough-shaped float extending across the outlet end of said tank, an outwardly inclined overflow lip along the outer edge of said float, means for adjustably holding said float partly immersed in the base glass with said lip situated parallel to and below the level of said base glass, and means for feeding flashing glass into said float, thereby causing said flashing glass to flow over said lip and spread out as a surface layer on the layer of base glass as it flows over said sill, and means controlling the flow of flashing glass into said float and the angular inclination of the overflow lip of said float to control the thickness of the layer of flashing glass.

3. A furnace for the continuous production of flashed glass comprising a melting tank for the base glass having a sill at a downstream outlet end over which molten base glass flows in a thin layer, a fore-tank at the outlet end of said melting tank and into which the base glass flows, an outlet sill at the downstream discharge end of said fore-tank over which the base glass flows in a thin layer, a trough-shaped float extending across said fore-tank, said float being partly immersed in the base glass and having an overflow lip extending across the whole width of said fore-tank and facing said outlet sill, means for keeping said lip under the level of said base glass in said tank, an auxiliary tank containing molten flashing glass and means for conveying said flashing glass into said float, thereby causing said flashing glass to flow over said lip and spread out as a surface layer on the layer of base glass as it flows over said sill and means controlling the flow of flashing glass into said float and level of said float in said tank to control the thickness of the layer of flashing glass.

4. A furnace for the production of flashed glass comprising a melting tank for the base glass having a sill at a downstream outlet end over which molten base glass flows in a thin layer, a trough-shaped float extending across the outlet end of said tank, a barrier dividing said float into two longitudinal compartments connected with each other at the bottom, the compartment in said float facing said sill at the outlet end of said tank being provided with an overflow lip, means for supplying flashing glass to the other of said compartments, and means for holding said float in a partly immersed position with said lip slightly below the level of the base glass in said tank so that the flashing glass will flow out of said float over said overflow lip as a thin layer onto the surface of said layer of base glass flowing over said sill.

5. A furnace as claimed in claim 3, wherein said float has a U-shaped cross-section, the overflow lip being provided on the shank of the U nearer said sill, said auxiliary tank being arranged to deliver the flashing glass into the other shank of the U.

6. A furnace as claimed in claim 3, wherein said auxiliary tank is located on one side of and substantially at right angles to said fore-tank.

7. A furnace as claimed in claim 3, wherein said float is engaged in recesses formed in the walls of said fore-tank.

8. A furnace as claimed in claim 3, wherein said melting tank has a side wall provided with openings, additional auxiliary tanks being fitted in said openings so as to be heated from said main tank, any of said additional auriliary tanks being interchangeable with the first-mentioned auxiliary tank.

9. Method for the continuous production of flashed glass, which comprises feeding flashing glass composition in a solid state from a source to an auxiliary melting station, melting the flashing glass composition, supplying the melted flashing glass from said auxiliary melting station to the surface of a flowing molten base glass, flowing said flashing glass in the form of a thin web onto the surface of the flowing base glass with the top surface of the flashing glass out of contact with a solid body, controlling the thickness of the web of overflowing flashing glass by mechanically controlling the level of the bottom surface of said web with relation to the normal level of the surface of the base glass and by controlling the rate of feeding of the flashing glass composition to the auxiliary melting staion, to control the level of the top surface of said web.

10. Method for the continuous production of flashed glass, which comprises feeding flashing glass composition in a solid state from a source to an auxiliary melting station, melting the flashing glass composition, supplying the melted flashing glass from said auxiliary melting station to the surface of a flowing molten base glass, flowing said flashing glass in the form of a thin web onto the surface of the flowing base glass with the top surface of the flashing glass out of contact with a solid body, controlling the thickness of the web of overflowing flashing glass by controlling the rate of the feeding of the solid flashing glass composition to the auxiliary melting station, and maintaining the thickness of the web constant by mechanically controlling the level of the bottom surface of said web with relation to the normal level of the surface of the base glass.

References Cited in the file of this patent

UNITED STATES PATENTS

| | | |
|---|---|---|
| 1,670,247 | Ferngren | May 15, 1928 |
| 1,910,759 | Engels | May 23, 1933 |
| 2,264,245 | Lytle | Nov. 25, 1941 |

FOREIGN PATENTS

| | | |
|---|---|---|
| 576,340 | Germany | Sept. 27, 1931 |
| 584,015 | Germany | Sept. 13, 1933 |